3,458,566
PRODUCTION OF SALTS OF ORGANIC ACIDS
Harry Yakimik, Jr., Garfield, N.J., assignor to Tenneco Chemicals, Inc., a corporation of Delaware
No Drawing. Filed Oct. 5, 1966, Ser. No. 584,371
Int. Cl. C07c *51/52*
U.S. Cl. 260—521                                  10 Claims

ABSTRACT OF THE DISCLOSURE

The sodium salt of salicylic acid is made by adding the acid to a sodium carbonate solution while maintaining pH less than 8 and temperature less than 60° C.

---

This invention relates to an improved process for preparing high quality alkali metal salicylates. More particularly the invention pertains to the preparation of high quality sodium salicylate.

Alkali metal salts of salicylic acid and substituted salicylic acids often contain colored impurities which not only give the salt products an undesirable color, but also render the salts unsatisfactory for their ultimate commercial application since the color is imparted to the finished products. This color problem is particularly serious where the alkali metal salicylic acid salt such as sodium salicylate is employed in the pharmaceutical industry. Similar problems arise where the alkali metal salts of salicylic acid are employed as intermediates in the chemical synthesis of various compounds and compositions.

The removal of the colored impurities from the salicylic acid salts by means of distillation, extraction, or other conventional purification procedures is not economically attractive due to the expenses involved and the necessary loss of some of the salicylic acid salt. Various stabilizing and chelating agents have also been employed to inhibit color formation or to mask the colorants in the alkali metal salts of salicylic acid or products made therefrom. The use of such special materials has numerous drawbacks such as incompatibility with the end use of the salicylic acid salts, and it often does not have a permanent effect as, for example, when the salicylic acid salts or products made therefrom are stored prior to commercial use or consumption. It would be desirable therefore to have a process available whereby high quality salicylic acid salts could be readily produced on a commercial scale without requiring the special product purification procedures or the addition of special agents to the salt products heretofore proposed.

One object of this invention is to provide an improved process for the preparation of high quality alkali metal salts of salicylic acids.

Another object of this invention is to provide an improved process for the preparation of high quality sodium salicylate.

A further object of this invention is to prepare high quality alkali metal salicylates from salicylic acid or substituted salicylic acids while avoiding the formation of undesirble colorants.

A still further object of this invention is to provide an improved process for the direct neutralization of salicylic acid to produce high quality alkali metal salts substantially free of undesirable coloration.

These and other objects of the present invention will become readily apparent from the ensuing description and illustrative embodiments.

It is well known that alkali metal salicylates can be prepared by reacting salicylic acid or derivatives thereof with alkali metal carbonates. When high grade alkali metal salicylates are desired, it is customary to employ purified salicylic acid, e.g., sublimed salicylic acid, and high purity alkali metal carbonates. The neutralization reaction is generally carried out in an aqueous medium. In accordance with the present invention, it has now been found that high quality alkali metal salicylates, i.e., salt products substantially free of undesirable color, can be achieved by such a process only by the use of special operating conditions. In the absence of such conditions, the salicylic acid salt products are characterized by a distinctive yellow color.

One of the most important operating conditions required for the production of the alkali metal salts is the addition of the salicylic acid feed material to an aqueous solution of the alkali metal carbonate, rather than the conventional procedure wherein the neutralization is effected by the addition of the aqueous metal carbonate solution to the salicylic acid. As will be hereafter demonstrated, the latter procedure results in an alkali metal salt of salicylic acid having an undesirable coloration. Although all of the reasons why the order of addition is of importance are not fully understood at this time, it is believed that by utilizing the reverse order of addition prescribed herein, alkali bicarbonate formation is prevented and the formation of undesirable colorant by-products is avoided. In general, it is also preferred to add the salicylic acid rapidly and to agitate the resulting reaction mixture. Such procedures facilitate the rapid removal of by-product carbon dioxide from the reaction mixture, which also prevents bicarbonate formation.

Another important aspect of the present invention resides in the discovery that the pH of the reaction mixture should be maintained less than about 8, and preferably within the range of about 5 to 7.5, once the reaction or foaming commences. If the pH of the reaction mixture exceeds 8, alkali metal bicarbonate forms followed by cessation of the reaction and colorant buildup.

In order to obtain high quality alkali metal salicylates it is preferred to maintain the reaction below about 60° C., since the use of higher reaction temperatures, e.g. 70° C, or greater, also will lead to the formation of colorant contaminants. The preferred reaction temperature will range from about 5° to 40° C. The process of this invention is generally carried out under atmospheric pressure, although it will be understood that the exact pressure employed is not critical.

As previously discussed, high purity or sublimed salicylic acid is employed as the starting material. Although the use of salicylic acid is preferred, the reaction may also be readily carried out with substituted salicylic acids, i.e., substituted hydroxybenzoic acids, such as p-aminosalicylic acid, 5-tertiarybutylsalicylic acid, 3-methyl-5-isopropylsalicylic acid, 3-methyl-4-isopropylsalicylic acid, 4-hexylsalicylic acid, 5-phenylsalicylic acid, and the like or mixtures thereof.

The alkali metal carbonate reactant is also of high purity and generally is of the monohydrate type. Sodium or potassium carbonates are preferred, and the former is required in order to produce the commercially important high grade sodium salicylate product. The alkali metal carbonate is employed in the form of an aqueous solution containing from about 18 to 30%, preferably 22.5 to 30%, by weight of the carbonate. The alkali metal carbonate will generally be present in an amount which will be stoichiometrically sufficient to react with all of the salicylic acid in the reaction mixture.

The water employed in forming the aqueous solutions of the salicylic acid and the alkali metal carbonate should also be of high purity. Ordinary tap water is undesirable since it generally contains iron or other metallic impurities in relatively high concentration which, as is well known in this art, will impart an undesirable pink or brown color to the alkali metal salicylate products. For most purposes, therefore, it is preferred to use distilled water. At times, depending upon the source of the water, it may also be useful to subject the distilled water to an ion exchange treatment to ensure that harmful impurities are reduced below contaminating levels.

The improved process of this invention generally comprises the addition of high purity salicylic acid to an aqueous solution of high purity alkali metal carbonate while maintaining the reaction temperature and the pH of the reaction mixture within the aforementioned ranges. As also indicated, the salicylic acid solution is preferably added rapidly and with agitation to permit the escape of by-product carbon dioxide as quickly as possible from the reaction mixture. The time of addition may, of course, vary widely; however, generally it should range from about 7 to 15 minutes. The resulting reaction product mixture comprises the alkali metal salicylate and water. The amount of feed materials employed will generally result in a product mixture containing from about 20% to 45% by weight of the alkali metal salicylate. It has been found that such concentrations, and especially the higher concentrations, lead to the best product quality.

Conventional procedures may be employed to recover the alkali metal salicylate from the water. Thus, for example, the aforedisclosed aqueous reaction product mixture may be heated under vacuum to effect dehydration. Other procedures and equipment which may be employed include spray drying, rotary vacuum dryer, drum dryer, and thin-film evaporator. It will be understood, however, that the exact manner of recovering the high quality alkali metal salicylate is not an important aspect of this invention.

The invention will be more fully understood by reference to the following illustrative embodiments. Although these embodiments are directed to the preparation of sodium salicylate, which is of prime commercial importance, other alkali metal salicylates may also be readily prepared by the practice of this novel process.

EXAMPLE I

Run A

A 2-liter flask fitted with an agitator, thermometer and a pH probe was charged with 300 grams of salicylic acid (sublimed grade) and 400 grams of distilled water. The resulting slurry was heated with agitation on a water bath to 60° C. A 20% by weight sodium carbonate solution was made up by using 150 grams of sodium carbonate (reagent grade) and 600 grams of distilled water. A total of 500 mls. of this sodium carbonate solution was fed into the flask through a funnel into the agitated reaction mixture under the conditions set forth below.

| Time, minutes | Temperature, °C. | $Na_2CO_3$, ml. |
|---|---|---|
| 0 | 63.5 | 0 |
| 10 | 61 | 50 |
| 20 | 67 | 85 |
| 30 | 67 | 160 |
| 40 | 64 | 220 |
| 50 | 67 | 270 |
| 60 | 67 | 320 |
| 65 | 62 | 420 |
| 70 | 66 | 500 |

The resulting reaction product mixture had a distinctive yellow color. Approximately 601 grams of the solution was evaporated to dryness under a reduced pressure of 29 inches Hg. The dried sodium salicylate product was yellow in color and had an APHA color rating of 150 cloudy.

Run B

Utilizing the apparatus of Run A, a second run was carried out by initially charging 300 grams of salicylic acid (sublimed) and 500 grams of distilled, ion-exchanged water to the reaction flask. A total of 510 mls. of the 20% by weight sodium carbonate solution was added under the conditions set forth below:

| Time, minutes | Temperature, °C. | pH | $Na_2CO_3$, ml. |
|---|---|---|---|
| 0 | 59 | 1.0 | 0 |
| 3 | 66 | 2.5 | 80 |
| 10 | 75 | 2.5 | 143 |
| 18 | 74 | 2.7 | 195 |
| 23 | 73 | 2.75 | 225 |
| 28 | 72 | 2.82 | 250 |
| 33 | 70 | 2.85 | |
| 38 | 70.5 | 2.85 | 320 |
| 43 | 74 | 2.75 | 345 |
| 48 | 76 | 2.7 | 375 |
| 50 | 75 | 2.85 | 405 |
| 53 | 76 | 3.0 | 430 |
| 56 | 75 | 4.7 | 510 |

The sodium salicylate product was recovered by the method employed in Run A. The dried product also had a yellow color, and an APHA rating of 40 cloudy.

EXAMPLE II

Run C

The same apparatus as in Run A was employed. Three hundred grams of distilled water was charged to the flask at ambient temperatures, followed by the addition of 90 grams of sodium carbonate (monohydrate grade). Two hundred grams of salicylic acid (sublimed) was then added with agitation over a period of 15 minutes. The addition of the salicylic acid was as rapid as possible without permitting the foaming caused by the by-product carbon dioxide to become excessive or to cease. The use of agitation was helpful in controlling the foaming. The reaction conditions are as follows:

| Time, minutes | Temperature, °C. | pH | |
|---|---|---|---|
| 0 | 24 | 4.8 | $NaCO_3$ added. |
| ½ | 30 | 11.4 | Salicylic acid addition. |
| 1 | 25 | 9.2 | |
| 2 | 23 | 6.2–8.0 | Foaming. |
| 3 | 18 | 5.9–6.3 | Do. |
| 4 | 14 | 5.6–6.3 | Do. |
| 5 | 10 | 5.5–5.9 | Foaming; addition completed. |
| 8 | 10 | 6 | Clear solution. |
| 10 | 25 | 6.15 | Do. |

The resulting clear reaction product solution had the following analysis:

| | |
|---|---|
| Salicylic acid, percent weight | 0.23 |
| Specific gravity, 25° C. | 1.185 |
| APHA, clear | 10 |
| Percent solids (calculated) | 44.1 |

Four hundred grams of the solution was dehydrated to produce 163.4 grams of colorless sodium salicylate having the following characteristics:

| | |
|---|---|
| Water, percent weight | 0.03 |
| Salicylic acid, percent weight | 0.14 |
| APHA rating, clear | 11 |
| THT color rating [1] | 110 |

[1] A test developed to determine the color rating of the sodium salicylate under basic conditions. The test comprises dissolving 10 grams of the sodium salicylate product in 10 ml. of distilled water followed by the addition of 0.2 ml. of 10% sodium carbonate solution. The color is then read after mixing well and waiting 3 minutes on the APHA scale. Higher ratings indicate that undesirable coloration will develop when the sodium salicylate is employed under conditions where the pH exceeds 7.

Run D

A neutralization reaction was carried out under the same conditions of Run C except that the pH of the reaction mixture exceeded 8. Sodium bicarbonate formed and the reaction ceased. A noticeable build-up of yellow color occurred. The reaction could only be started again by raising the reaction temperature to 70° C. A highly yellow-colored sodium salicylate product was recovered from the reaction product mixture.

Run E

A neutralization treatment similar to Run C was carried out under the following reaction conditions:

| Time, minutes | Temperature, °C. | pH | |
|---|---|---|---|
| 0 | 70 | 4.1 | Na₂CO₃ added. |
| ½ | 68 | 11.3 | Salicylic acid added. |
| 2 | 65 | 9.2 | Very slight foaming. |
| 3 | 60 | 5.6 | Salicylic acid addition completed. |
| 5 | 63 | 5.75 | Clear solution. |
| 7 | 63 | 5.5 | Do. |

The clear reaction product solution had an APHA rating of 16 clear. Four hundred grams of this solution was dehydrated to produce 130 grams of sodium salicylate having the following characteristics:

APHA rating _____ Very slightly cloudy
Percent salicylic acid _____ 0.60
THT rating _____ 150–180

The above data show that it was possible to obtain a high quality sodium salicylate product by adding the salicylic acid to the sodium carbonate solution during the neutralization step. The importance of maintaining the pH of the reaction mixture below 8 and the reaction temperature below 60° C. in order to attain a sodium salicylate product free of the usual deleterious coloration under various conditions has also been demonstrated.

While particular embodiments of this invention are delineated above, it will be understood that the improved neutralization process of this invention for the preparation of alkali metal salicylates may be subjected to variations and modifications without departing from its broader aspects.

What is claimed is:

1. A process for the preparation of high grade alkali metal salicylates which comprises adding a high purity salicylic acid to an aqueous solution of an alkali metal carbonate, maintaining the resulting reaction mixture at a pH less than about 8 and heating said reaction mixture to a temperature less than about 60° C., and then recovering a high grade alkali metal salicylate from the reaction mixture.

2. The process of claim 1 wherein said alkali metal carbonate is sodium carbonate.

3. The process of claim 1 wherein said reaction mixture has a pH ranging from about 5 to 7.5.

4. The process of claim 1 wherein said reaction temperature ranges from about 5° to 40° C.

5. The process of claim 1 wherein said alkali metal salicylate is recovered from the reaction mixture by removing substantially all of the water therefrom.

6. A process for the preparation of sodium salicylate free of undesirable coloration which comprises adding high purity salicylic acid to an aqueous solution containing high purity water and sodium carbonate at a rate sufficient to maintain the pH of the reaction below about 8 while heating the reaction mixture to a temperature of less than about 60° C. to obtain an aqueous reaction product mixture containing sodium salicylate and water, and recovering said sodium salicylate from the aqueous reaction product mixture.

7. The process of claim 6 wherein said high purity salicylic acid is sublimed salicylic acid.

8. The process of claim 6 wherein said high purity water is distilled water.

9. The process of claim 6 wherein said pH is within the range of about 5 to 7.5 and said temperature is within the range of about 5° to 40° C.

10. The process of claim 6 wherein said addition of the salicylic acid is carried out rapidly and the reaction mixture is agitated during the neutralization reaction.

References Cited

Remington's Practice of Pharmacy, 12th Ed. Martin and Cook, 1961, p. 1086.

Dispensatory of the United States of America, Part I, 1955, p. 1296.

JAMES A. PATTEN, Primary Examiner

D. STENZEL, Assistant Examiner